United States Patent [19]
Dorsch

[11] Patent Number: 4,618,306
[45] Date of Patent: Oct. 21, 1986

[54] SELF CONTAINED DRUM DUMPER FOR FORK TRUCKS

[75] Inventor: William J. Dorsch, Wheeling, Ill.

[73] Assignee: Liftomatic Material Handling Co., Inc., Evanston, Ill.

[21] Appl. No.: 758,847

[22] Filed: Jul. 26, 1985

Related U.S. Application Data

[63] Continuation of Ser. No. 480,900, Mar. 31, 1983, abandoned.

[51] Int. Cl.[4] ........................ B65G 65/24; B65G 65/34

[52] U.S. Cl. .................................... 414/420; 414/422; 414/607; 414/642; 414/909; 414/912; 335/285

[58] Field of Search ............... 414/420, 422, 607, 620, 414/642, 912, 918, 724, 909, 920; 248/206 A, 537; 335/285; 339/12 R; 212/160

[56] References Cited

U.S. PATENT DOCUMENTS

| | | | |
|---|---|---|---|
| 2,721,717 | 10/1955 | Wales | 248/206 A |
| 2,756,883 | 7/1956 | Schreck | 414/420 |
| 3,726,424 | 4/1973 | Du Puis et al. | 414/607 |
| 3,971,485 | 7/1976 | Hoppey | 414/420 |
| 4,144,981 | 3/1979 | Borgen | 414/607 |
| 4,252,495 | 2/1981 | Cook | 414/345 X |
| 4,278,395 | 7/1981 | Thunell | 414/659 X |

FOREIGN PATENT DOCUMENTS

| | | | |
|---|---|---|---|
| 2396710 | 3/1979 | France | 414/608 |

OTHER PUBLICATIONS

H. D. Bauer Catalog sheet and English Translation of the Model FD/H Drum Dumper Fork-Lift Truck Attachment.

Catalog sheet entitled "Single Function Auxiliary Hose Kits".

*Primary Examiner*—Robert J. Spar
*Assistant Examiner*—Stuart J. Millman
*Attorney, Agent, or Firm*—Hill, Van Santen, Steadman & Simpson

[57] ABSTRACT

A drum dumper attachment for fork lift trucks carries its own power plant eliminating all heretofore required hose and other connections to the truck and controlled from the truck operator's seat by a demountable switch connected to the power plant through a single extension cord. The dumper attachment has hollow shoes receiving the truck forks, a rotatable clamp receiving a drum, a hydraulic jack rotating the clamp, an electric motor driven hydraulic pump for the jack, a battery energizing the motor, an electrically controlled valve selectively flowing fluid to and from opposite ends of the jack, and a double pole switch positionable adjacent the operator to energize the motor and the valve for causing the jack to rotate the clamp in opposite directions. The switch may be anchored to the truck by a magnet and the extension cord may be coiled to accommodate positioning of the switch. The attachment is completely self contained and avoids heretofore required couplings, conversion kits, and the like components for energizing a dumper from the hydraulic system of the truck.

14 Claims, 6 Drawing Figures

FIG. 1
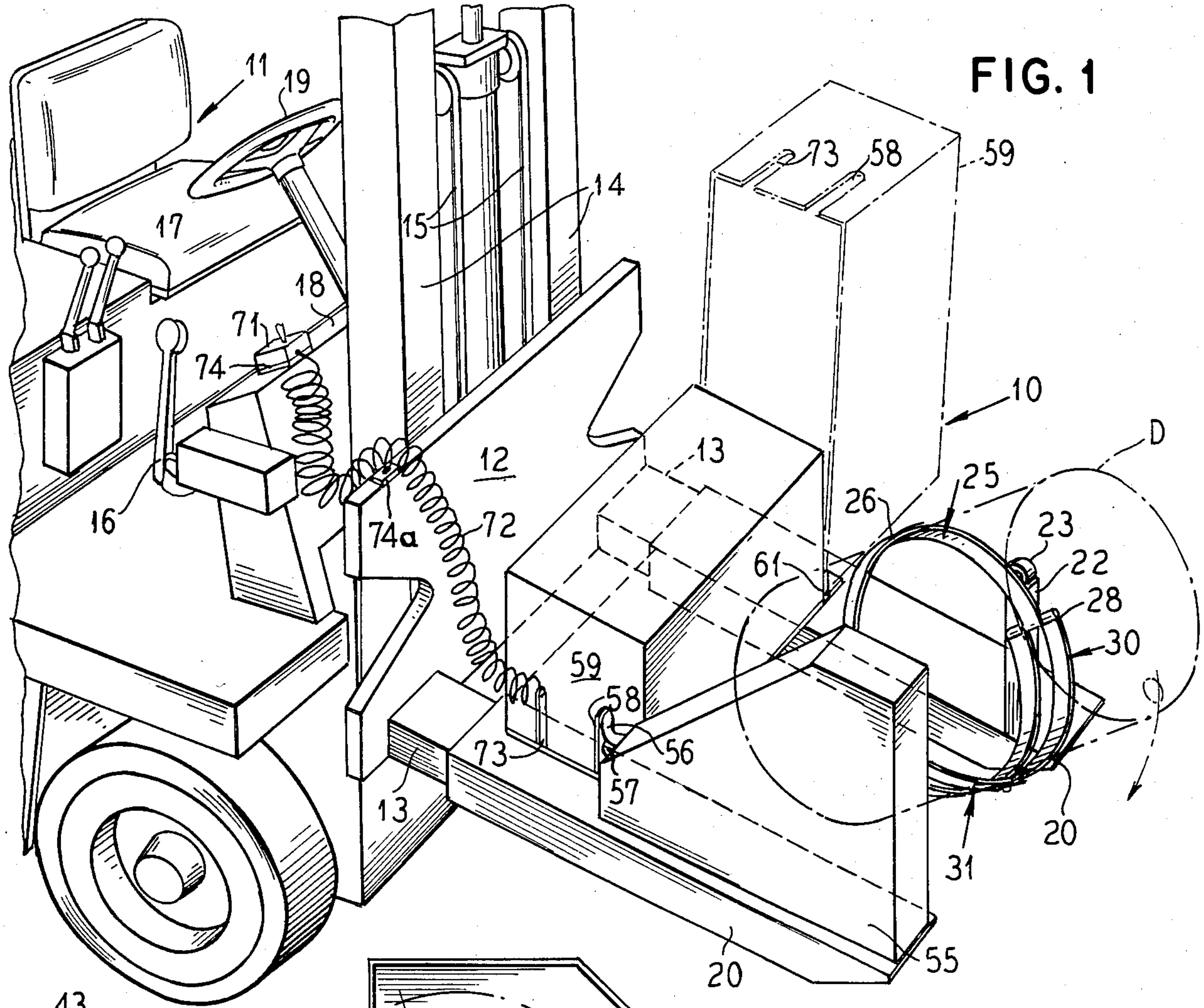
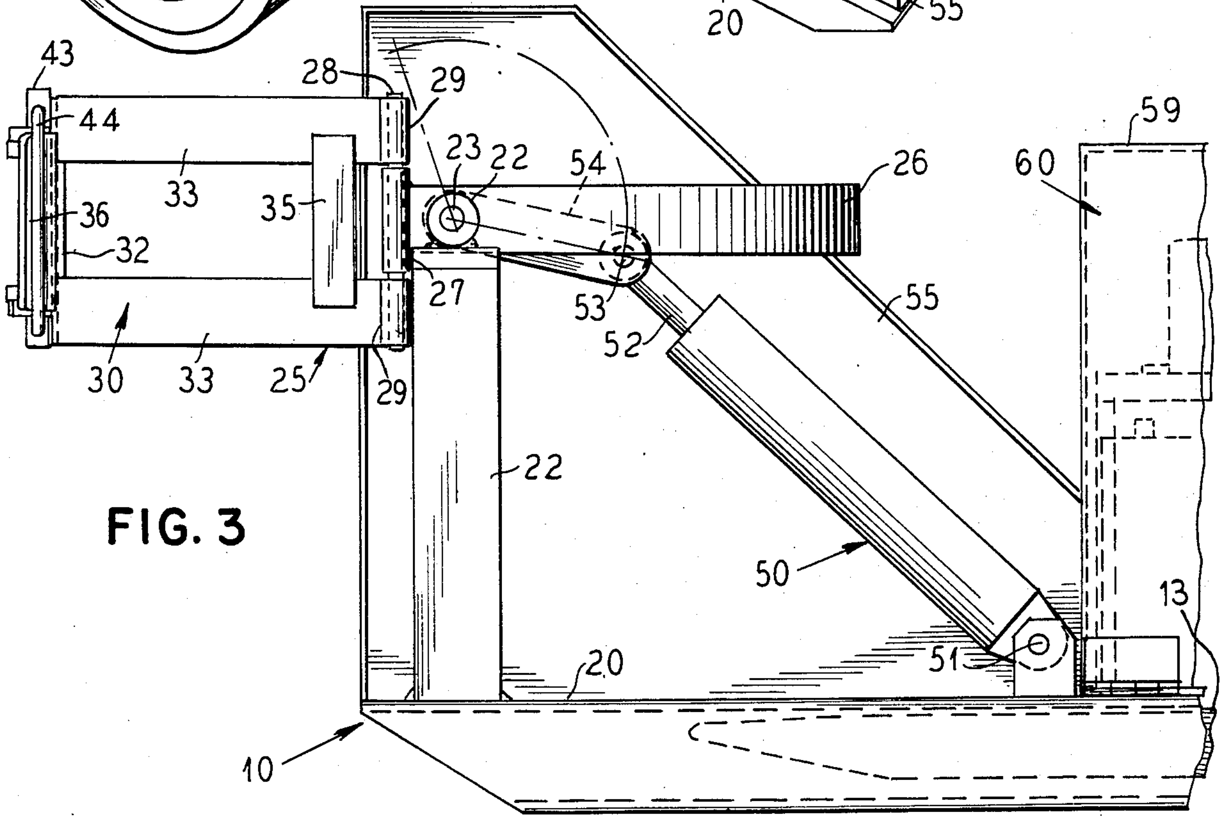
FIG. 3

SELF CONTAINED DRUM DUMPER FOR FORK TRUCKS

This is a continuation of application Ser. No. 480,900 filed Mar. 31, 1983, abandoned.

BACKGROUND OF THE INVENTION

1. Field of the Invention

This invention relates to the art of attachments for fork lift trucks and particularly deals with a completely self contained powered drum dumper attachment for fork trucks.

2. Prior Art

Prior known drum dumping adapters for fork lift trucks were powered from the truck and required attachments that had to be disconnected each time the adapter was removed. It would be an improvement in the art to eliminate all heretofore required adapter kits, couplings, and the like to provide a powered drum dumper attachment for fork trucks which is completely self-contained, carries its own source of power, and is controlled from the driver's seat of the truck through a single extension cord and demountable switch.

SUMMARY OF THIS INVENTION

According to this invention there is provided a drum dump attachment for fork lift trucks which has a frame equipped with shoes receiving the truck forks, a rotating drum clamp, a hydraulic jack for rotating the clamp, and a power package driving the jack controlled by a single electrical cord to a switch demountably mounted at a convenient location adjacent the driver's seat of the truck. The power plant is mounted on the base plate of the frame behind the clamp and a box cover on the base plate houses the power plant components. These components include one or more electric storage batteries, an electric motor driven hydraulic pump with a fluid reservoir, a solenoid valve controlling fluid flow between the pump and jack, hoses connecting the valve with the jack, an electric circuit controlling the motor and valve, and, if desired, a rectifier or charger unit for the batteries. A single, preferably coiled extension cord connects an over-center two-pole switch with the circuitry to energize the motor and control the valve for operating the jack in opposite directions to rotate the clamp. Bearings on the frame rotatably support the clamp on a horizontal axis and the clamp is adjustable to receive drums of different sizes.

In operation it is only necessary to drive the forks of the truck into the shoes of the frame and to place the switch on the truck adjacent the driver's seat. The switch housing can be provided with a permanent magnet to attach it to the truck. The clamp is then rotated and opened to receive a drum and closed to tightly embrace the drum. The forks can then be lifted to raise the drum to a desired height, the truck can be driven to the dumping station, and the switch can be manipulated by the operator to rotate the clamp for tilting the drum to a dumping position. Then when the truck is needed for other purposes, the emptied drum can be lowered to the ground, released from the clamp, the switch placed on the attachment, and the truck forks retracted from the attachment leaving it completely isolated from the truck without requiring any uncoupling of components.

It is then an object of this invention to provide a completely self-contained powered drum dumper attachment for fork lift trucks.

Another object of this invention is to provide a drum dumping adapter for fork trucks which is hydraulically operated from its own power source and requires but a single extension cord to a control adjacent the truck seat.

A specific object of this invention is to provide a drum dumper attachment for fork trucks having a frame with shoes receiving the forks of the truck, a rotating drum clamp, a hydraulic jack rotating the clamp, a complete power unit and valve control for operating the jack, and a single electrical cord connection to a switch magnetically held adjacent the truck seat.

Other and further objects of this invention will be apparent to those skilled in this art from the attached sheets of drawings and the following detailed description.

ON THE DRAWINGS

FIG. 1 is a front and side perspective view of a drum dumper of this invention mounted on the forks of a lift truck and illustrating the single coiled extension cord and control switch on the truck dash board.

FIG. 3 is a fragmentary side elevational view of the attachment showing the drum clamp in horizontal position.

DESCRIPTION OF THE PREFERRED EMBODIMENT

Figures 2, 6:
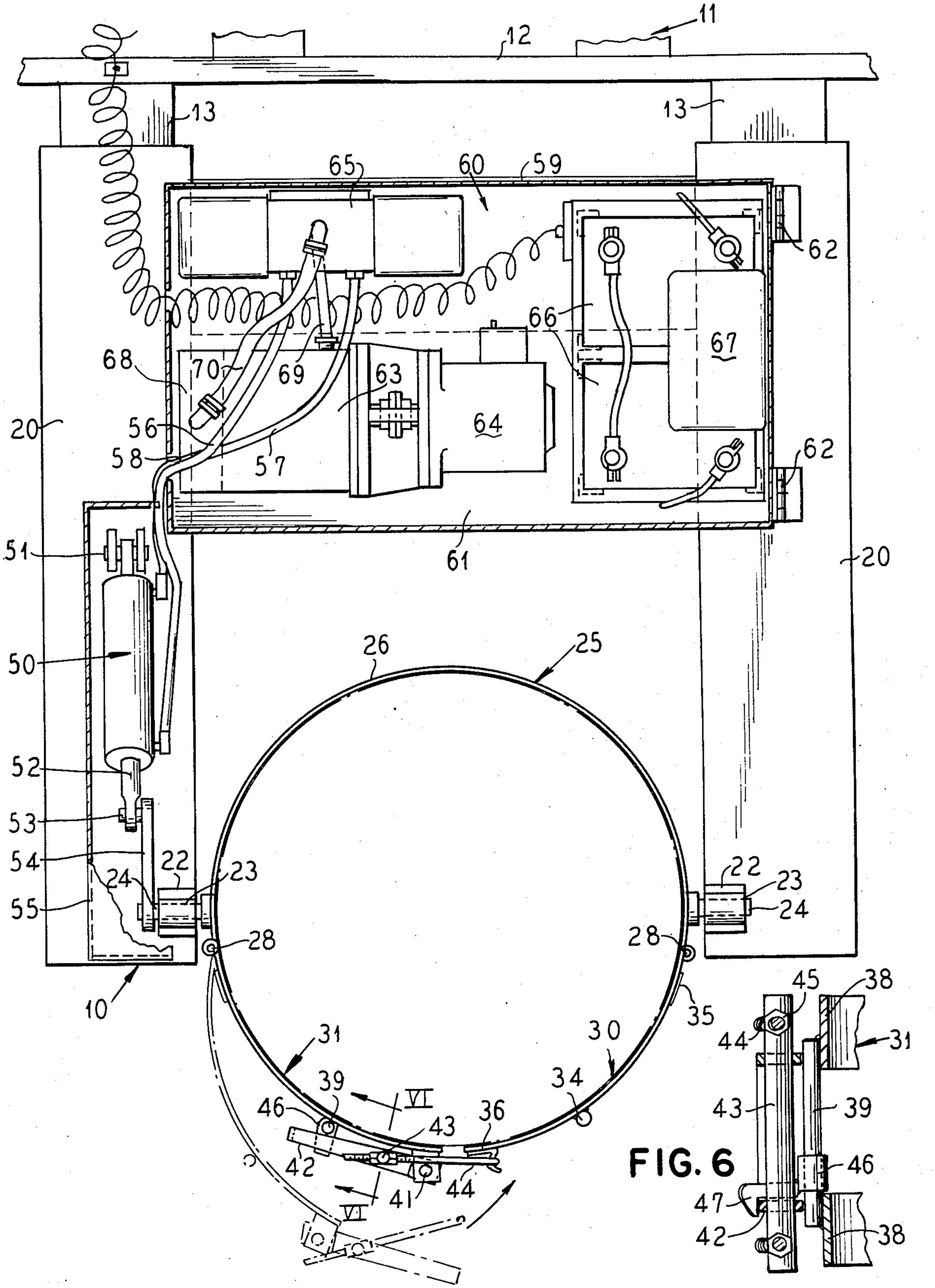
FIG. 2 is a plan view of the attachment of FIG. 1 with portions broken away and shown in horizontal section and with portions in dotted lines illustrating the opening of the drum clamp.
FIG. 6 is a fragmentary sectional view of the clamp lock taken along the line VI—VI of FIG. 2.

In FIG. 1 the reference numeral 10 designates generally the self-contained drum dumper attachment or adapter of this invention mounted on a conventional fork lift truck 11. As illustrated, the truck 11 has an elevator 12 on the front end thereof from which projects a pair of forks 13, 13. The elevator 12 is guided on tracks 14 and is raised and lowered by cables, chains or the like 15 powered from a hydraulic system controlled by levers such as 16 adjacent the driver's seat 17 with a dashboard 18 and a steering wheel 19 positioned in front of the seat 17.

The drum dumper attachment 10 of this invention has a U-shaped main frame including a pair of hollow side beams 20 connected at their rear ends by a rigid cross beam 21 and positioned to receive the truck forks 13. These beams provide shoes open at the rear ends and having upwardly tapered closed front ends. Upright pedestals 22 on the front ends of the side beams 20 have bearings 23 on the tops thereof journalling pins 24 projecting laterally from a drum clamp 25.

The clamp 25 has a fragmental cylindrical band 26 with an open side from which the pins 24 project. As shown in FIG. 2 this band 26 has the pins centered on a diameter line through the axis of the cylinder while the end of the band projects slightly beyond the pins to upright tubular sockets one of which is shown at 27 in FIG. 3. These sockets receive hinge pins 28 therethrough.

The pins 28 extend through top and bottom sockets 29 of closure gates 30 and 31 for the open side of the band 26. Each closure gate 30 and 31 is a U-shaped member on the same radius and struck from the same center as the band 26. The U-shaped gate 30 has an upright bight portion 32 with top and bottom legs 33 terminating in the hinge portions 29 and reinforced by a welded on upright rod 34 about mid-way of their lengths. An upright strut 35 is also welded to these legs 33 adjacent the hinge ends 29. A latch finger 36 is welded to the outer face of the bight portion 32.

The gate 31 has the upright bight portion 37, the top and bottom legs 38 terminating in the sockets 29, the upright strut rod 39 at the mid-sections thereof, and the upright strut 40 adjacent the sockets 29, similar to the gate 30. In addition, however, the gate 31 mounts, adjacent its free end, an upright pin 41 swingably supporting a U-shaped handle 42 with top and bottom legs receiving a pin 43 therethrough in spaced relation from the pin 41. The ends of the pin 43 receive the ends of a U-shaped hasp 44. Nuts 45 threaded on the legs of the hasp 44 on opposite sides of the pin 43 adjust the projection of the hasp from the pins.

An adjustable clamp lock is thus provided on the gate 31 with a hasp adapted to be received in the finger 36 on the gate 30. Thus when the handle 42 is pulled outwardly from the gate 31 to swing about the pin 41, the pin 43 is swung about the axis of the pin 41 to project the hasp out of the finger 36. Conversely, when the handle 42 is swung toward the gate 31,the hasp 44 is retracted to seat in the finger 36 and draw the gates 30 and 31 together.

A safety lock for the latch is provided by a sleeve 46 on the rod 39. As shown in FIG. 6, this sleeve has a finger 47 adapted to overlie a leg of the handle 42 preventing it from swinging outwardly away from the gate 31.

Figure 4:
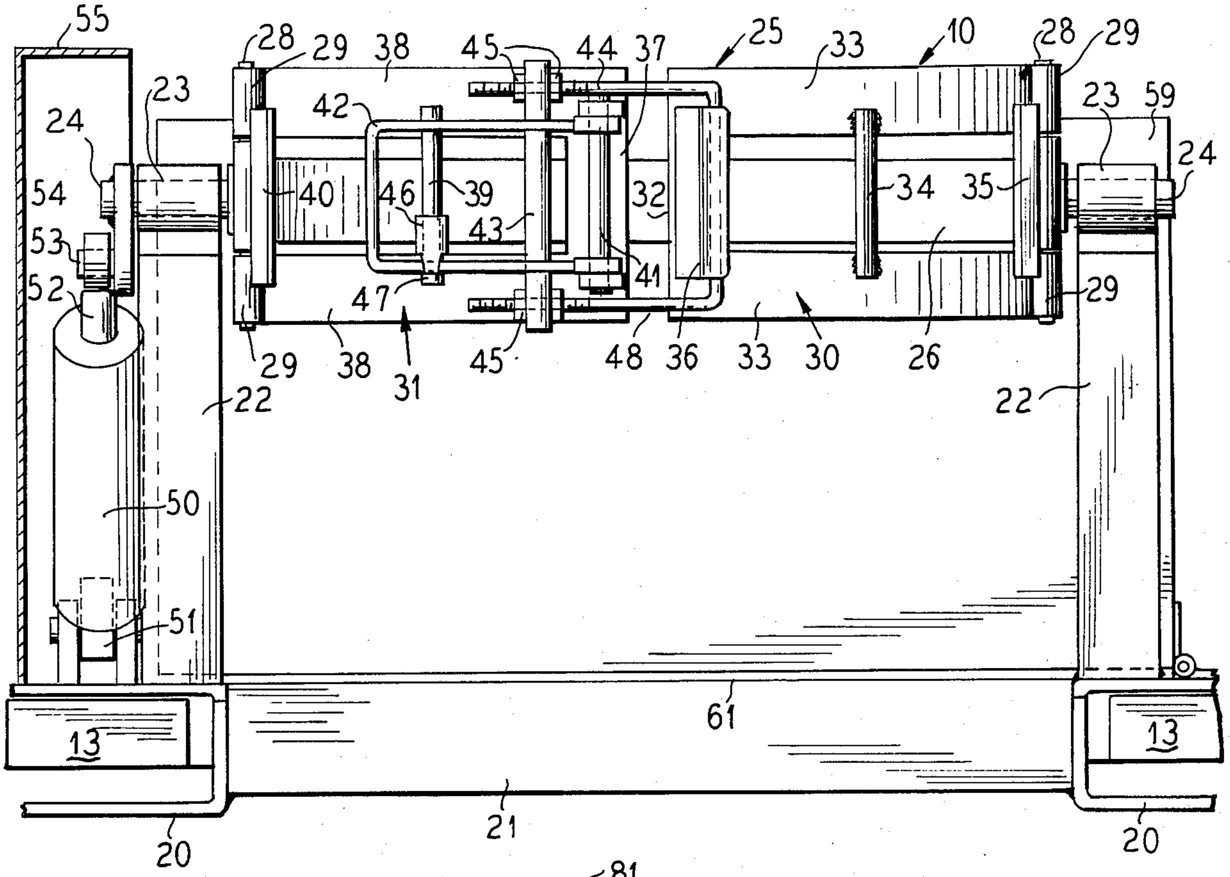
FIG. 4 is a front elevational view of the attachment showing the drum clamp in locked position.

As shown in FIG. 4, a gap 48 is provided between the gates 30 and 31 in their closed position and the nuts 45 can adjust the position of the hasp 44 to vary the width of the gap for causing the gates to clamp tightly around an inserted drum D illustrated in FIG. 1. When the gates are closed the drum D is completely encircled by the clamp 25 with the single band 26 embracing the rear half of the drum and the gates 30 and 31 embracing the front half of the drum. The double bands of the gates 30 and 31 embrace a wider area of the front half of the drum and bear the load of the drum as it is tilted to a dumping position. Roll beads (not shown) on the drum prevent it from slipping through the closed clamp.

A hydraulic jack 50 has its cylinder pivoted at 51 to the top of one of the frame legs 20 adjacent the rear end of the leg while the piston rod 52 projecting from the other end of the cylinder is pivoted at 53 to one end of a link 54, the other end of which is secured to the shaft pin 24 projecting beyond the bearing 23.

When the piston rod 52 is in its retracted position as shown in FIG. 3, the drum clamp 25 is in a horizontal position to surround a drum resting upright on the floor, for example. However, when the piston rod 52 is forced outwardly of the cylinder 50, the link 54 will be rotated to drive the clamp 25 to an inclined position, tilting the encircled drum forwardly to a dumping position.

An upright hood 55 on the side beam 20 mounting the jack 50, envelopes the jack and link to protect the moving parts.

The ends of the jack cylinder are coupled to fluid supply and return hoses 56 and 57 on opposite sides of the piston in the cylinder to reciprocate the piston rod 52 thus providing for the power tilting of the clamp 25. These hoses 56 and 57 are threaded through the rear end of the hood 55 and through a slot 58 in the bottom of a box cover 59 for the power assembly 60, the components of which are mounted on a base plate 61 straddling the side legs 20 of the main frame. This cover 59 is hinged at 62 to one of the legs 20 and is swingable from a closed horizontal position to an open upright position as illustrated in FIG. 1. The slot 58 receiving the hoses 56 and 57 has an open bottom to accommodate lifting of the box lid 59.

The power package 60 mounted on the base plate 61 includes a hydraulic pump 63 driven by an electric motor 64, a solenoid valve 65, one or more electric storage batteries 66 and a battery charger 67 generally illustrated in FIG. 2. The hydraulic pump has a conventional built-in reservoir for hydraulic fluid designated generally at 68 and delivers pressurized fluid to the solenoid valve 65 through an inlet conduit 69 while returning fluid from the valve back to the reservoir 68 through a conduit 70.

As shown in FIG. 1, a switch 71 mounted on the dashboard 18 of the truck 11 is connected to the power plant through a single coiled extension cord 72 entering the box lid 59 through an open bottom slot 73 alongside the slot 58 receiving the hoses 56 and 57. The switch 71 has a casing with a permanent magnet 74 on the bottom thereof to hold the switch on the dashboard 18 while, of course, accommodating each removal of the switch from all connection with the truck. It will be especially noted in FIG. 1 that the only connection between the adapter 10 and the truck is through the single coiled electric cord 72 and it will be apparent that this connection is easily separated by lifting the switch box off of the dashboard 18. If desired, a second magnet 74*a* can be attached to an intermediate portion of the cord 72 and held on the elevator 12, for example, to prevent the cord from becoming entangled on the truck.

Figure 5:
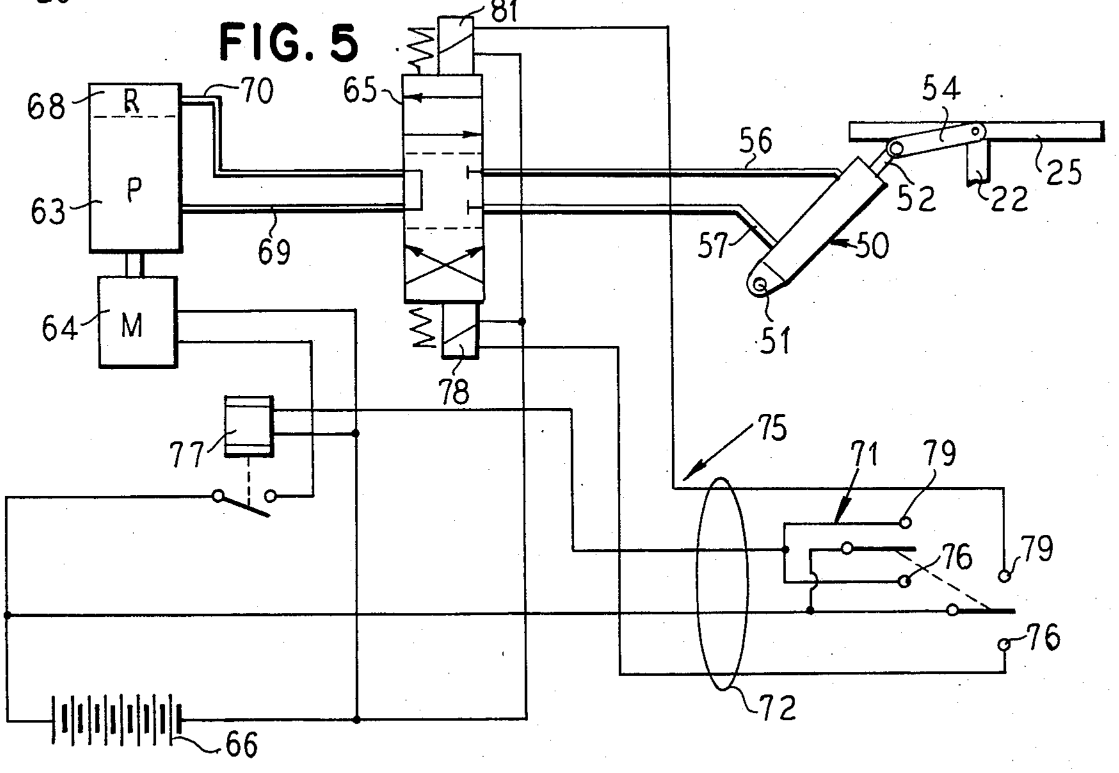
FIG. 5 is a schematic showing of the electric and hydraulic circuitry for the attachment.

As shown in FIG. 5, the single extension cord 72 has four conductors controlling a circuit 75 including the switch 71, the battery 66, the motor 64, and the solenoids of the valve 65. The switch 71 is preferably of the spring centered double pole type which when depressed in one direction has terminals 76 closed to energize a relay circuit 77 activating the motor 64, and a solenoid circuit 78 opening the valve 65 to flow pressurized fluid through the conduit 69 and the hose 56 to the top of the cylinder 50 retracting the piston rod 52 and rotating the clamp 25 in a counterclockwise direction. Fluid in the cylinder 50 under the piston is simultaneously drained through the hose 57 and conduit 70 back to the pump reservoir 68.

When the switch is depressed in the opposite direction to close contacts 79, circuits will be closed to again energize the motor 64 and to then energize a solenoid circuit 81 switching the valve to feed pressurized fluid through the conduit 69 and hose 57 into the bottom of the cylinder 50 and draining fluid from the top of the cylinder through the hose 56 and conduit 70 back to the reservoir 68. This then tilts the clamp 25 in a clockwise direction.

In the neutral position of the switch 71 where the contacts 69 and 79 are open, the motor 64 is deenergized and the valve 65, being spring centered, is closed to block flow of fluid thus holding the piston of the cylinder 50 in a locked condition.

As illustrated in FIG. 2 the batteries 66 are connected in series, for example, with two six-volt batteries creating a twelve-volt potential for energizing the power pack. Alternately, of course, twelve-volt batteries could be used and connected in parallel. The charger 67 is, of course, arranged to be plugged into a source of alternating current to charge the batteries of the selected voltage.

From the above descriptions, it will thus be understood that fork lift trucks can now be adapted for clamping a drum or barrel, lifting and conveying the clamped drum to desired location and then tilting the drum as desired to empty its contents, without in any way altering or modifying the truck. The adapter is a complete powered separate assembly and is mounted on and removed from the truck by merely sliding the forks into and out of receiving shoes.

While various changes and modifications might be proposed by those skilled in the art, it will be understood that I wish to include within the claims of the patent warranted hereon all such changes and modifications as reasonably come within my contribution to the art.

I claim as my invention:

1. An independent self powered drum dumping attachment unit quickly mounted on, operated in its mounted position, and demounted from the forks of driver seat equipped fork lift trucks by the truck driver without leaving the truck seat and controlled by the driver from his seat when mounted on the forks which comprises a U-shaped frame having a rear bight portion and forwardly projecting sides with elongated hollow fork receiving shoes with open rear ends for receiving the forks, a drum encircling clamp between the front ends of the sides of the U-shaped frame and rotatably mounted on said sides, a hydraulic jack mounted on one side of the U-shaped frame for rotating said drum encircling clamp, an energy source on the bight portion of said frame for said jack, a single portable switch controlling the energy source and the hydraulic jack adapted to be selectively positioned on the fork lift truck adjacent the driver seat when the attachment is mounted on the forks of the truck, and a single flexible cord connection between the energy source and switch.

2. The attachment of claim 1 including a magnet on the switch for clamping the switch on the truck.

3. The attachment of claim 2 including a second magnet on the cord for clamping an intermediate portion of the cord to the truck.

4. The attachment of claim 1 wherein the clamp has an open front band embracing the back portion of a drum, pins extending from the sides of the band at the open front journals on the frame receiving the pins, gates hinged on the open front ends of the band closing the open front thereof to embrace the front portion of the drum, and a latch locking the gates around the drum.

5. The attachment of claim 1 including an adjustable latch on the clamp controlling its closed size to tightly embrace a drum.

6. The attachment of claim 1 wherein the power means includes a hydraulic jack, a fluid pump, an electric pump motor and a solenoid valve and the energy source is an electric storage battery.

7. The attachment of claim 6 including a box housing the pump, motor, valve and battery.

8. An independent self powered drum dumping attachment unit quickly mounted on and demounted from the forks of fork lift trucks of the type having a driver's seat and an elevator in front of the seat with a pair of forwardly projecting horizontal forks, and said attachment being mounted on and removed from the forks and being operated on the forks by the truck driver from his seat position, which comprises a U-shaped frame having a pair of elongated hollow shoes on the side legs thereof and a transverse bight portion, said shoes having open rear ends for receiving the truck forks, a drum encircling clamp rotatably mounted on the side legs of the U-shaped frame and positioned between said legs, a hydraulic jack mounted on one leg of the U-shaped frame rotating said clamp, a power package mounted on the bight portion of said U-shaped frame including an electric motor driven hydraulic pump, a solenoid actuated valve receiving fluid from and draining fluid back to the pump, hoses connecting the valve with opposite ends of the hydraulic jack, a battery for energizing the electric motor, a demountable switch selectively positioned adjacent the driver's seat, a single electrical cord connection between the switch and the power package, circuitry controlled by the switch to energize the motor and to activate the valve to flow and drain fluid into and out of opposite ends of the jack for rotating the clamp in opposite directions, said drum encircling clamp having an open front band for embracing the back portion of the drum, gates hinged on the open front ends of the band selectively closing the open front thereof to embrace the front portion of a drum, a latch keeper on one gate, a latch on the other gate selectively receiving said keeper, and means for adjusting said latch to control the closed size of the clamp for tightly embracing a drum around the complete circumference thereof.

9. The attachment of claim 8 including a box lid hinged on the frame enclosing the power package.

10. The attachment of claim 9 wherein the lid has open bottom slots for the hoses and cord.

11. The attachment of claim 8 wherein the pump has a fluid reservoir.

12. The attachment of claim 8 wherein the valve is spring loaded to stop fluid flow when deenergized and the jack then holds the clamp in fixed position.

13. A self powered independent drum dumping attachment unit quickly mounted on, operated in its mounted position, and demounted from the forks of a driver's seat equipped fork lift truck by the truck driver on the truck and controlled by said driver without leaving the seat which comprises a U-shaped frame having forwardly projecting side legs with elongated hollow shoes adapted to receive the forks of the lift truck along the lengths of the fork, upright pedestals on the forward ends of said side legs, a drum encircling clamp between said side legs tiltably mounted on said pedestals, a jack having a cylinder pivoted on a side leg and a piston rod linked to rotate the clamp in opposite directions, a power plant mounted on the bight portion of the U-shaped frame in spaced relation behind the drum encircling clamp, said power plant including a battery, an electric motor driven pump, a spring centered solenoid valve, a fluid reservoir, conduits connecting the pump, reservoir, valve and cylinder to flow fluid into and out of opposite ends of the cylinder, a single control switch, circuitry controlled by the switch to energize the motor and valve, a single coiled extension cord between the switch and power plant, and a magnet for selectively holding the switch on the fork lift truck at a site convenient to the truck operator whereby the forks of the truck are easily inserted into and removed from the hollow shoes when the attachment is resting on the ground and the attachment when mounted on the forks is controlled by the truck operator from said switch.

14. The attachment of claim 13 including a permanent magnet on the switch clamping the switch to the truck.

* * * * *